(12) United States Patent
Reynolds et al.

(10) Patent No.: US 11,113,746 B1
(45) Date of Patent: Sep. 7, 2021

(54) METHOD, MEDIUM, AND SYSTEM FOR AUTOMATED PRODUCT IDENTIFICATION

(71) Applicant: INTERNATIONAL BUSINESS MACHINES CORPORATION, Armonk, NY (US)

(72) Inventors: Spencer Thomas Reynolds, Austin, TX (US); Zachary A. Silverstein, Austin, TX (US); Jacob Ryan Jepperson, Ausstin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/855,037

(22) Filed: Apr. 22, 2020

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0639* (2013.01)

(58) Field of Classification Search
CPC ........... G06Q 30/0639; G06Q 30/0631; G06Q 30/0251; G06Q 30/0256; G06Q 30/0257; G06Q 30/0261
See application file for complete search history.

(56) References Cited

U.S. PATENT DOCUMENTS

| | | | |
|---|---|---|---|
| 8,285,840 B2 | 10/2012 | Dobroth | |
| 9,400,995 B2 | 7/2016 | Gu | |
| 9,674,124 B1 * | 6/2017 | Fisher | H04L 51/20 |
| 10,185,934 B2 | 1/2019 | Gupta | |
| 2011/0078021 A1 | 3/2011 | Tullis | |
| 2011/0251918 A1 | 10/2011 | Yarvis | |
| 2015/0112826 A1 | 4/2015 | Crutchfield, Jr. | |

(Continued)

FOREIGN PATENT DOCUMENTS

EP 2487870 B1 7/2013

OTHER PUBLICATIONS

Mikusz, Mateusz et al.; Raising Awareness of IoT Sensor Deployments; Living in the Internet of Things: Dybersecurity of the IoT; Mar. 28-29, 2018; 8 pages. (Year: 2018).*

(Continued)

*Primary Examiner* — Matthew E Zimmerman
(74) *Attorney, Agent, or Firm* — Schmeiser, Olsen & Watts; Stephanie Carusillo

(57) ABSTRACT

A method, system, and computer program product for automating product identification is provided. The method includes receiving from users, permission to identify and monitor items associated with the users. Local devices located at a first geographical location are detected in response to receiving permission and identification data identifying each device is stored. A user and a user device are detected arriving at the first geographical location and communications between the user device and the local devices are established. The identification data and associated metadata describing the local devices is retrieved and the user and the user device are detected arriving at a second geographical location. A request for locating a specified item is received. In response, the identification data and associated metadata is analyzed and resulting network search results including a list of items and associated descriptions associated with the request are presented to the user.

20 Claims, 7 Drawing Sheets

(56) References Cited

U.S. PATENT DOCUMENTS

2017/0206554 A1* 7/2017 Craft ................ H04L 51/18
2019/0052593 A1   2/2019 Flores

OTHER PUBLICATIONS

Mikusz, Mateusz et al; Raising Awareness of IoT Sensor Deployments; Living in the Internet of Things: Cybersecurity of the IoT; Mar. 28-29, 2018; 8 pages.

* cited by examiner

US 11,113,746 B1

METHOD, MEDIUM, AND SYSTEM FOR AUTOMATED PRODUCT IDENTIFICATION

BACKGROUND

The present invention relates generally to a method for product identification and in particular to a method and associated system for accurately identifying a product for implementing a network search of the product.

SUMMARY

A first aspect of the invention provides an automated identification method comprising: receiving, by a processor of an identification hardware device from a plurality of users, permission to identify and monitor items associated with the plurality of users; detecting, by the processor via a plurality of sensors in response to the receiving the permission, local devices located at a first geographical location; storing, by the processor, identification data within a network device, wherein said identification data identifies each device of the local devices; detecting, by the processor via the plurality of sensors, a user and a user device, of the user, arriving at the first geographical location; establishing, by the processor, communications between the user device and the local devices; retrieving for the user device, by the processor, the identification data and associated metadata describing the local devices; detecting, by the processor via the plurality of sensors, the user and the user device arriving at a second geographical location differing from the first geographical location; receiving, by the processor via the user device, a network based request for locating a specified item; analyzing, by the processor in response to the network based request, the identification data and associated metadata; and presenting, to the user in response based on results of the analyzing, network search results comprising a list of items and associated descriptions associated with the network based request, wherein the list of items and associated descriptions comprise an entry associated with at least one device of the local devices.

A second aspect of the invention provides an computer program product, comprising a computer readable hardware storage device storing a computer readable program code, the computer readable program code comprising an algorithm that when executed by a processor of an identification hardware device implements an automated identification method, the method comprising: receiving, by the processor from a plurality of users, permission to identify and monitor items associated with the plurality of users; detecting, by the processor via a plurality of sensors in response to the receiving the permission, local devices located at a first geographical location; storing, by the processor, identification data within a network device, wherein said identification data identifies each device of the local devices; detecting, by the processor via the plurality of sensors, a user and a user device, of the user, arriving at the first geographical location; establishing, by the processor, communications between the user device and the local devices; retrieving for the user device, by the processor, the identification data and associated metadata describing the local devices; detecting, by the processor via the plurality of sensors, the user and the user device arriving at a second geographical location differing from the first geographical location; receiving, by the processor via the user device, a network based request for locating a specified item; analyzing, by the processor in response to the network based request, the identification data and associated metadata; and presenting, to the user in response based on results of the analyzing, network search results comprising a list of items and associated descriptions associated with the network based request, wherein the list of items and associated descriptions comprise an entry associated with at least one device of the local devices.

A third aspect of the invention provides an identification hardware device comprising a processor coupled to a computer-readable memory unit, the memory unit comprising instructions that when executed by the processor implements an automated identification method comprising: receiving, by the processor from a plurality of users, permission to identify and monitor items associated with the plurality of users; detecting, by the processor via a plurality of sensors in response to the receiving the permission, local devices located at a first geographical location; storing, by the processor, identification data within a network device, wherein said identification data identifies each device of the local devices; detecting, by the processor via the plurality of sensors, a user and a user device, of the user, arriving at the first geographical location; establishing, by the processor, communications between the user device and the local devices; retrieving for the user device, by the processor, the identification data and associated metadata describing the local devices; detecting, by the processor via the plurality of sensors, the user and the user device arriving at a second geographical location differing from the first geographical location; receiving, by the processor via the user device, a network based request for locating a specified item; analyzing, by the processor in response to the network based request, the identification data and associated metadata; and presenting, to the user in response based on results of the analyzing, network search results comprising a list of items and associated descriptions associated with the network based request, wherein the list of items and associated descriptions comprise an entry associated with at least one device of the local devices.

The present invention advantageously provides a simple method and associated system capable of accurately identifying a product for implementing a network search.

DETAILED DESCRIPTION

Throughout an average day, people may encounter a long list of products that they may find interesting. For example, during a visit to a friend's house, it's not uncommon to be interested in a product (e.g., a gadget or a unique machine) located at the friend's house. At a later time, the visitor may forget the a name, brand, or model of the product and therefore, the visitor may request information associated with the product and may attempt to locate the product quickly via a Website (e.g., associated with the product manufacturer) search enabled for researching the product or possibly purchasing the product. However, technology may constantly change and companies may be required to follow the technological advances to prevent themselves from becoming obsolete and/or irrelevant thereby losing a competitive market share. Therefore, an Internet of things (IoT) environment may be enabled to introduce a new model for providing dynamic recommendations to users and engaging the users with new type of commerce-based experiences.

Embodiments of the present invention enable an automated product identification process for deriving an association with device awareness being encountered for a path of a user (and a device) throughout a specified area with respect to measured time and space attributes. In response to detected past product awareness of encounters of the user, an Internet shopping experience filter is modified for the user based on a user defined encounter parameter. The automated product identification process may include:
1. Generating a profile for a purchase an item initiated by a first user.
2. Determining that a second user is in proximity with respect to the first user and expresses interest in the item.
3. Retrieving data from the profile for enabling the identification and/or purchase of the item by the second user.
4. Transmitting the data to the second user. The data may be retrieved from an IoT system.

Figure 1:
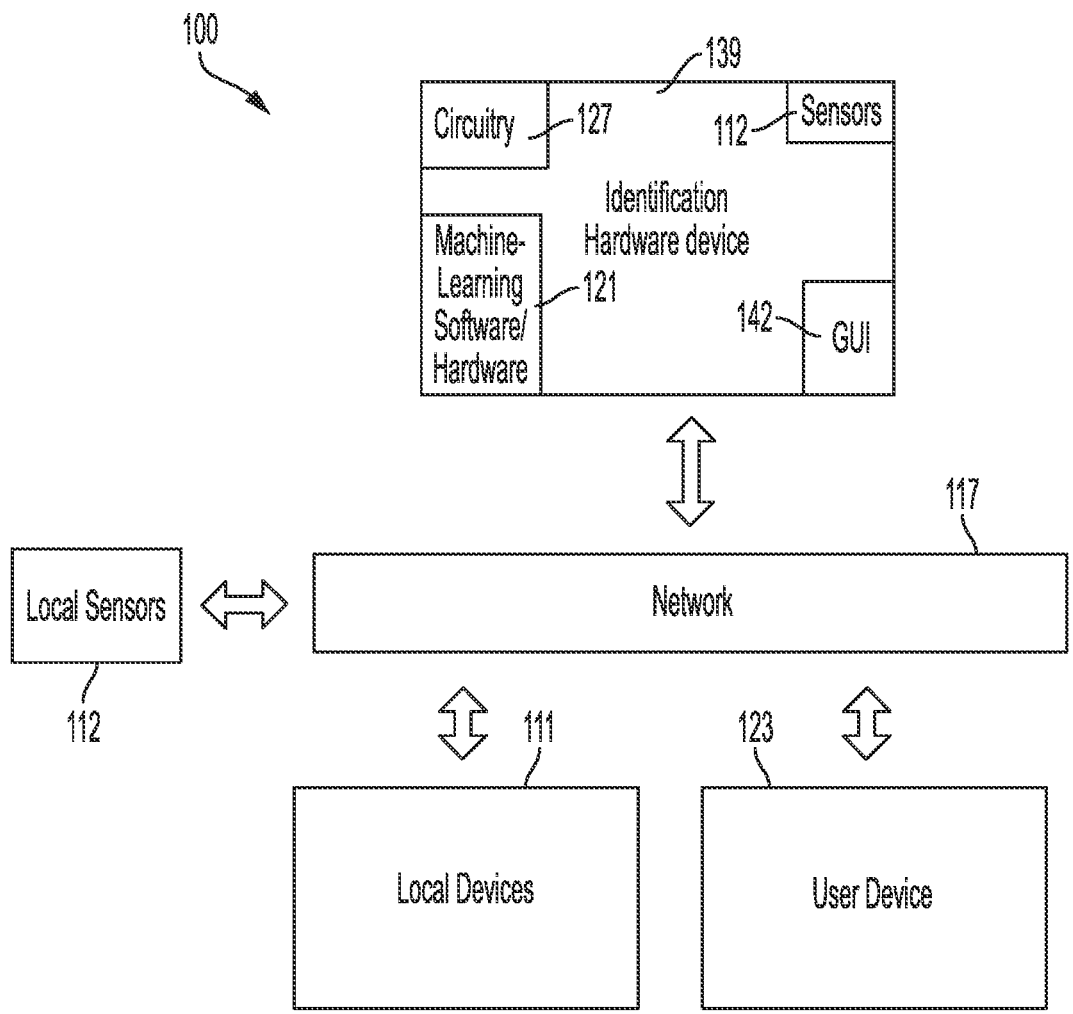
FIG. 1 illustrates a system for improving network and Internet technology associated with detecting and identifying local devices, establishing communications between a user device and the local devices, detecting geographical locations of the user device, and generating and presenting network search results associated with the user device and the local devices, in accordance with embodiments of the present invention.

FIG. 1 illustrates a system 100 for improving network and Internet technology associated with detecting and identifying local devices 111, establishing communications between a user device 123 and the local devices 111, detecting geographical locations of the user device 123, and generating and presenting network search results associated with the user device 123 and the local devices 111, in accordance with embodiments of the present invention.

System 100 of FIG. 1 includes an identification hardware device 139 (i.e., specialized hardware device), local devices 111, a user device 123, and local sensors 112 interconnected through a network 117. Identification hardware device 139 includes specialized circuitry 127 (that may include specialized software), sensors 112, a graphical user interface (GUI) and machine learning software code/hardware structure 121 (i.e., including machine learning software code). Identification hardware device 139 may include, inter alia, dedicated hardware, a computing device, a specialized hardware device, a mobile device, etc. Identification hardware device 139 may be Bluetooth enabled to provide connectivity to each other and any type of system. Sensors 110 and 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Local devices 111 may comprise any type of device or apparatus of interest to a user (e.g., a mobile phone, a smart appliance, a robotic device, etc.) that may be connected to a user device (e.g., an IoT device) for communications and associated information retrieval. Identification hardware device 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, Identification hardware device 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving network and Internet technology associated with detecting and identifying local devices 111, establishing communications between a user device 123 and the local devices 111, detecting geographical locations of the user device 123, and generating and presenting network search results associated with the user device 123 and the local devices 111. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for observing a user's past interactions with a product (or item) and dynamically enabling an internet of things (IoT) device for leveraging user behavior and/or social interactions to retrieve information associated with the product, wherein the system filters items for purchase based on the user's past interactions/ encounter with the product. Likewise, system 100 is configured to generate automated recommendations associated with a retail platform/website. The process is initiated when a product is identified by deriving an association with device awareness being encountered during a measured time and space associated with a path of a user throughout a specified area or measurable time and space. An associated Web based shopping and buying experience filter structure is tailored for the user based on an encounter parameter defined by the user based on detected past product IoT awareness associated with user encounters. Subsequently, a profile associated with a purchase of a given product (item) initiated by a first user is generated and a second user in proximity to the first user expressing interest in the given item) is detected. Data from the profile is retrieved. The retrieved data enables the identification and purchase of the item by the second user. Additionally, the retrieved data is transmitted to the second user.

The following processes describes implementation examples associated with automatically identifying a product of interest associated with a Web based search:

With respect to a first example, a user (Jill) is detected visiting a friend (Jackie) and during the visit, Jill notices that her friend Jackie has acquired a new robotic device that is autonomously vacuuming and cleaning the floor. Jill is impressed with attributes of the robotic device. The attributes include an increased amount of speed, precision, and an ability to navigate through a complex floorplan quickly with ease. Later that evening Jill initiates a Web search for the robotic device but is unable to look up the product as she forgot to ask for the name of the product from her friend Jackie. Therefore, system 100 implements a preprocess for previously associating the robotic device with Jill during the initial visit such that when Jill logs into her favorite online retailer (Website or Web application), a top hit in the search results includes the robotic device from her visit thereby improving a Web based search and purchasing experience.

With respect to a second example associated with large set of preferred products, a user (Hector) is currently searching for a new smartphone. During a specified time period at work, Hector is detected to be located within a conference room asking different co-workers about the types, brand(s), and model(s) of smartphones associated with each coworker. Hector was unable to retain or notate any information associated with the smartphone requests and therefore, system 100 generates the following results (associated with smartphones associated with each coworker) in response to a Web request for locating a smartphone for purchase:

| Priority Marker | Phone Product | Time Frame |
| --- | --- | --- |
| 13 Users | Phone 11 64 GB | 12 Hours |
| 9 Users | Phone 4 64 GB | 12 Hours |
| 3 Users | Phone 10 128 GB | 12 Hours |
| 2 Users | Phone R 64 GB | 7 Days |

The above table is presented to Hector thereby enabling him to understand that there was a total of 27 people he met within the conference room. Additionally, the table enables Hector to determine that many of his coworkers have purchased phone 11 and phones 4. Additionally, when he logs into a preferred online retailer, Hector is presented with the following ordered list of smartphones for possible purchase:

| Phone Product |
| --- |
| Phone 11 64 GB |
| Phone 4 64 GB |
| Phone 10 128 GB |
| Phone R 64 GB |

With respect to a third example associated with automated device recommendations, a user John (an avid espresso connoisseur) is detected visiting a friend Samantha. During the visit, John enjoys viewing features of Samantha's new espresso machine and he requests that a digital assistant (of his smart device) send him data associated with the espresso machine to his account. In response (upon his next online shopping search for espresso machines), he is presented with a search result for Samantha's espresso machine automatically filtered to a top of his returned Web results list. Additionally, the associated Website site calls out that the search results associated with Samantha's device were provided based on a specified date/time at a specified location thereby improving the search results.

System 100 enables the following functionality associated with automatically identifying items:

1. Generating a recommended variant of a device (e.g., a product) if a specific device is no longer available. Generating a recommended variant may include execution of a similarity analysis, analysis of reviews (e.g., from a friend/family, etc.), analysis of purchase data, etc.
2. Acknowledgment for gift ideas pushed to a guest device during identified associated time periods (e.g., birthday, holiday, event, etc.).
3. Filtering, prioritizing, and recommending a product based on a system outcome for an online Web based retail platform.
4. Utilization of a mobile device or TOT device instead of a router for communications implementation.
5. Utilization of packet length and cluster devices to locate a proper device type/family.

Data sharing processes associated with device identification may include:

1. Preventing personal information or data provided by the user or the device from being shared without the user's knowledge
2. Retrieving device specifications a device and associated software or hardware.
3. Tagging or recording a user's product information for determining a context (e.g., time, place, usage, etc.) of a location or product existence.
4. Time stamping temporal data for inferring contextual reference points for the product, the user, and/or the data collected.

Figure 2:
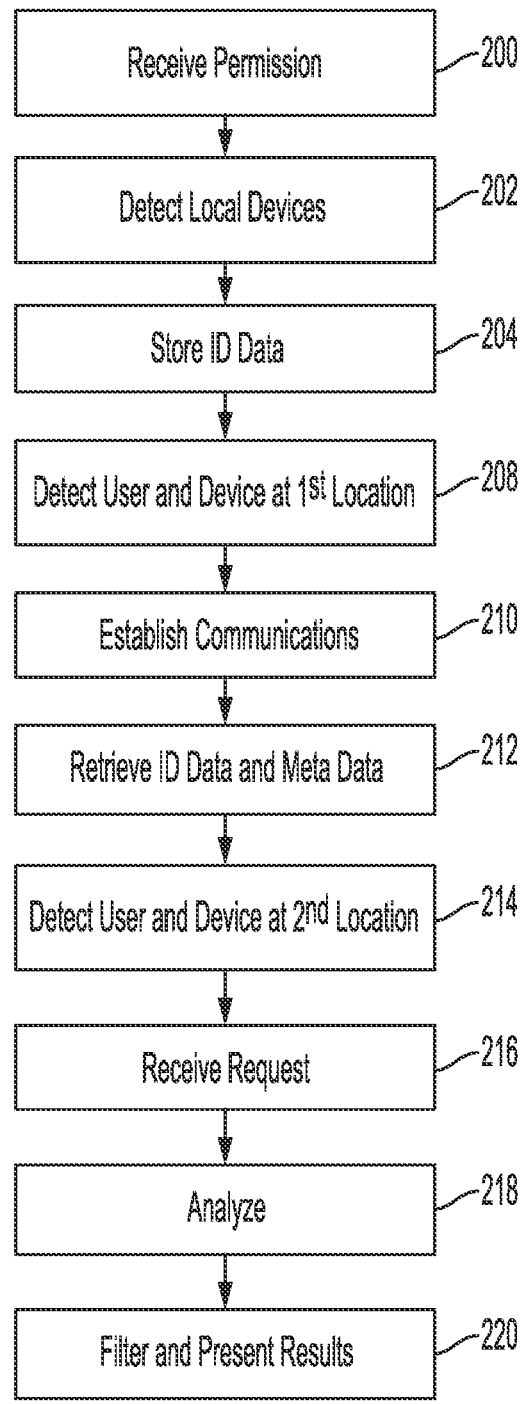
FIG. 2 illustrates an algorithm detailing a process flow enabled by the system of FIG. 1 for improving network and Internet technology associated with detecting and identifying local devices, establishing communications between a user device and the local devices, detecting geographical locations of the user device, and generating and presenting network search results associated with the user device and the local devices, in accordance with embodiments of the present invention.

FIG. 2 illustrates an algorithm detailing a process flow enabled by system 100 of FIG. 1 for improving network and Internet technology associated with detecting and identifying local devices, establishing communications between a user device and the local devices, detecting geographical locations of the user device, and generating and presenting network search results associated with the user device and the local devices, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by identification hardware device 139, local devices 111, and user device 123. In step 200, permission to identify and monitor items associated with users is received by an identification hardware device. In step 202, local devices located at a first geographical location are detected (in response to results of step 200) via a plurality of sensors. In step 204, identification data identifying each device (of the local devices) is stored within a network device. The identification data and associated metadata includes data and metadata comprising, inter alia, a unique identifier (UID), a device description, a device type, a device manufacturer, device operating characteristics, etc. The network device may comprise, inter alia, an IOT device, a router, etc.

In step 208, a user and a user device are detected arriving at the first geographical location. The first geographical location may include a location associated with a first user and the local devices may belong to the first user. In step 210, communications between the user device and the local devices are established. The communications may be enabled via a communication protocol comprising, inter alia, a WIFI protocol, a short-wavelength UHF radio wave protocol, an RFID protocol, etc.

In step 212, the identification data and associated metadata describing the local devices are retrieved for the user device. In step 214, the user and user device detected (via the sensors) arriving at a second geographical location differing from the first geographical location. In step 216, a network-based request for locating a specified item is received via the user device. In step 218, identification data and associated metadata are analyzed in response to receiving the network-based request. In step 220, network search results are presented to the user in response to the analysis of step 218. The network search results include a list of items and associated descriptions associated with the network-based request. The list of items and associated descriptions include an entry associated with at least one of the local devices. Additionally, the entry associated with the device may be filtered to a top portion of the list of items. The filtering process may include filtering, prioritizing, and recommending the entry based on an associated system outcome associated with differing online platforms. The entry may be associated with a same device as the at least one device. Alternatively, the entry may be associated with a recommended variant device with respect to the at least one device. The list of items may be presented to the user at a specified time period associated with a special occasion of the user.

Figure 3:
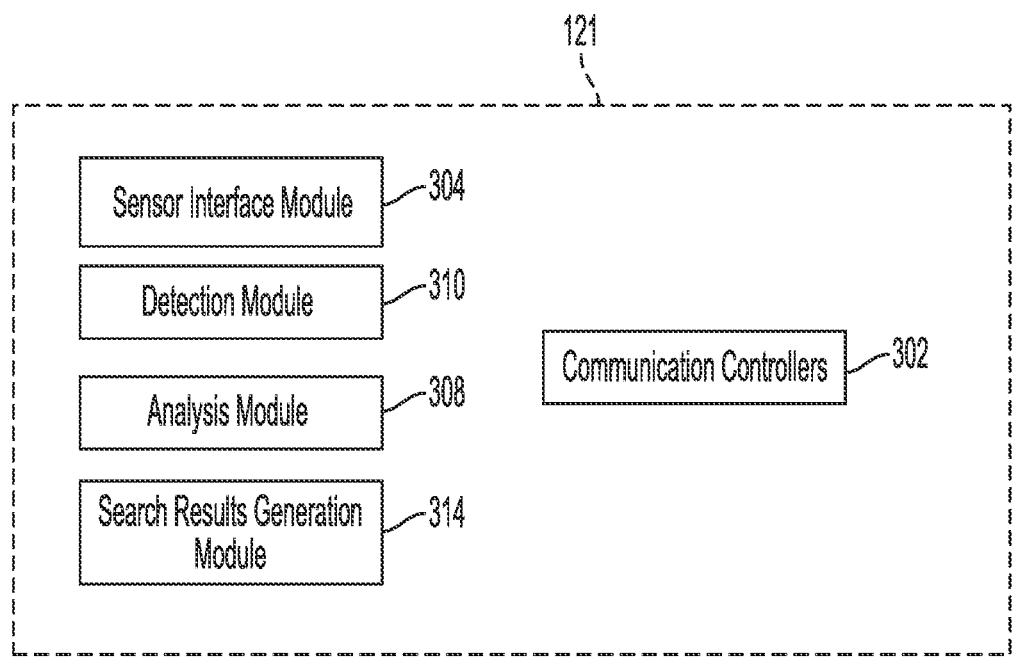
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes a sensor interface module 304, a detection module 310, an analysis module 308, a search results generation module 314, and communication controllers 302. Sensor interface module 304 comprises specialized hardware and software for controlling all functions related to sensors 110 or 112 of FIG. 1. Detection module 310 comprises specialized hardware and software for controlling all functionality related control of all detection functionality for implementing the process described with respect to the algorithm of FIG. 2. Analysis 308 comprises specialized hardware and software for controlling all functions related to the analysis steps of FIG. 2. Search results generation module 314 comprises specialized hardware and software for controlling all functions related to generating and filtering search results as described, supra. Communication controllers 302 are enabled for controlling all communications between sensor interface module 304, detection module 310, analysis module 308, and search results generation module 314.

Figure 4:
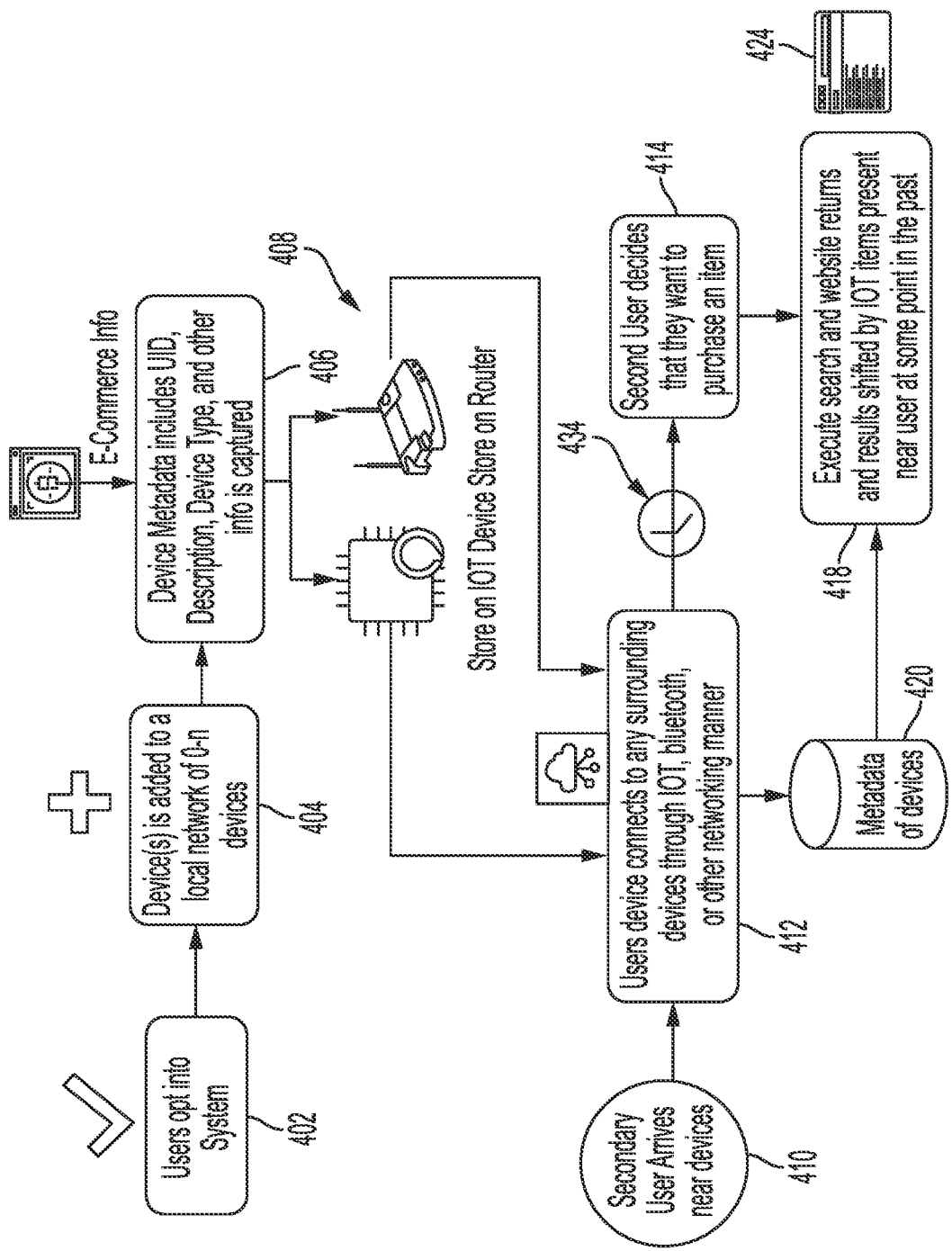
FIG. 4 illustrates an algorithm detailing a process flow enabled by the system of FIG. 1 for implementing a process for generating filtered search results, in accordance with embodiments of the present invention.

FIG. 4 illustrates an algorithm detailing a process flow enabled by system 100 of FIG. 1 for implementing a process for generating filtered search results 424, in accordance with embodiments of the present invention. In step 402, users opt into a monitoring system for enabling permission for identifying devices belonging to the user. In step 404, a device(s) belonging to a first user (of the users) is added to a local network of 0-n devices belonging to the first user. The local network of devices of the user may be located at a specified location of the first user. In step 406, E-commerce information and device metadata for the device(s) being added to the local network of 0-n devices is retrieved. The device metadata may include, inter alia, a UID, a description, a device type, etc. for the device being added to the local network. In step 408, the E-commerce information and device metadata is stored on a storage device such as, inter alia, an IoT device, a router, etc. In step 410, a second user is detected (via device detection of a second device of the second user) arriving a location of the first user. In step 412, the second device is automatically connected to the local network of 0-n devices. The connection may comprise, inter alia, a Bluetooth connection, an IoT connection, a network connection, etc. In step 414 (after a specified time period 434 has elapsed), the second user decides to purchase a device similar to a viewed device of the first user. In step 418, the device metadata is retrieved from a database 420 and a Web search is executed. In response, a Website returns a results list 424 associated with the executed search. The results list 424 comprises devices similar to the viewed device. The following process describes an implementation example associated with the algorithm of FIG. 4.

The process is initiated when a first user purchases a new device and in response to being detected (via a network of a system at a location of the first user), associated information is stored within a router of the network. For example, the information may include ip addresses and stored metadata. The stored metadata may include e-commerce info logged on the router or on device, a device UID, a device type/family, etc. Additionally, purchase information associated with the new device is captured and logged so that if a visitor is interested in the new device associated information is available. The new device is installed within a local area or location of the first user. Subsequently (at a later time period), a second user arrives to visit the first user and the system detects all devices located within an area surrounding the user's proximity. When the second user arrives home, it is determined that he/she wants to purchase the one of the detected devices and requests that the first user send over related information to assist with the purchase. The system subsequently correlates associated content to a specific context as detected by IOT devices and an automated online search is filtered and prioritized based on filter attributes such as: "Devices I've encountered", "Devices I've mentioned by context, "Devices that I asked for a recommendation", and "Filtering devices that I've encountered in the last few hours/days (e.g., time)".

Figure 5:
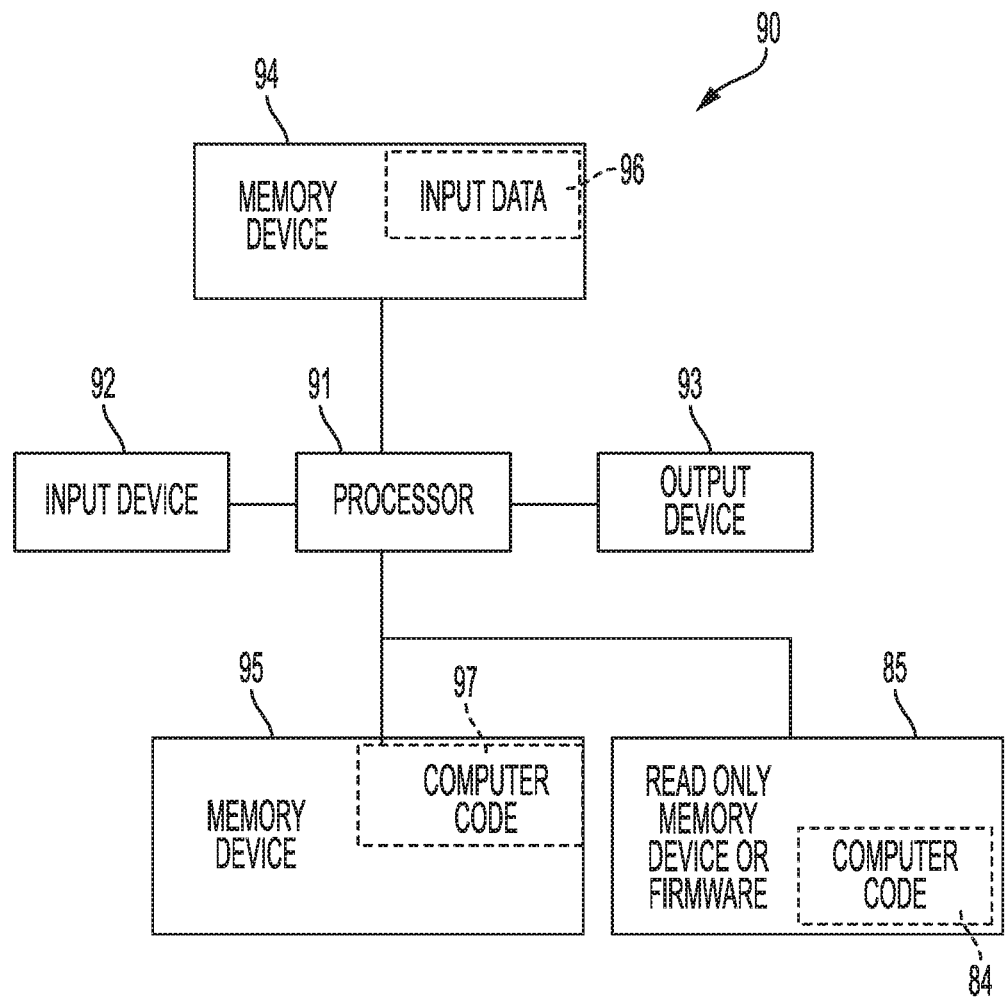
FIG. 5 illustrates a computer system used by the system of FIG. 1 for improving network and Internet technology associated with detecting and identifying local devices, establishing communications between a user device and the local devices, detecting geographical locations of the user device, and generating and presenting network search results associated with the user device and the local devices, in accordance with embodiments of the present invention.

FIG. 5 illustrates a computer system 90 (e.g., identification hardware device 139 local device 111, and/or user device 123 of FIG. 1) used by or comprised by the system of FIG. 1 for improving network and Internet technology associated with detecting and identifying local devices, establishing communications between a user device and the local devices, detecting geographical locations of the user device, and generating and presenting network search results associated with the user device and the local devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 4) for improving network and Internet technology associated with detecting and identifying local devices, establishing communications between a user device and the local devices, detecting geographical locations of the user device, and generating and presenting network search results associated with the user device and the local devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithms of FIGS. 2 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network and Internet technology associated with detecting and identifying local devices, establishing communications between a user device and the local devices, detecting geographical locations of the user device, and generating and presenting network search results associated with the user device and the local devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network and Internet technology associated with detecting and identifying local devices, establishing communications between a user device and the local devices, detecting geographical locations of the user device, and generating and presenting network search results associated with the user device and the local devices. In another embodiment, the invention provides a business method that performs the process steps of the invention on a subscription, advertising, and/or fee basis. That is, a service supplier, such as a Solution Integrator, could offer to enable a process for improving network and Internet technology associated with detecting and identifying local devices, establishing communications between a user device and the local devices, detecting geographical locations of the user device, and generating and presenting network search results associated with the user device and the local devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
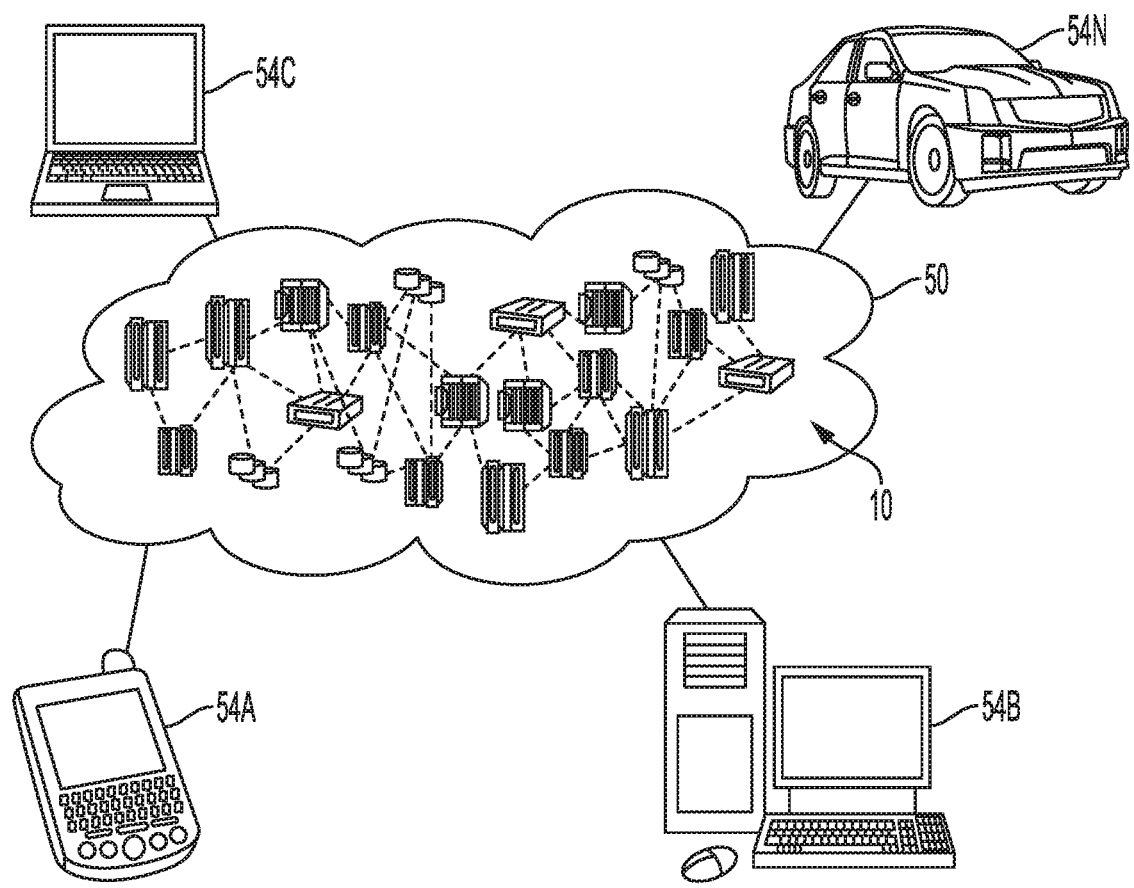
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
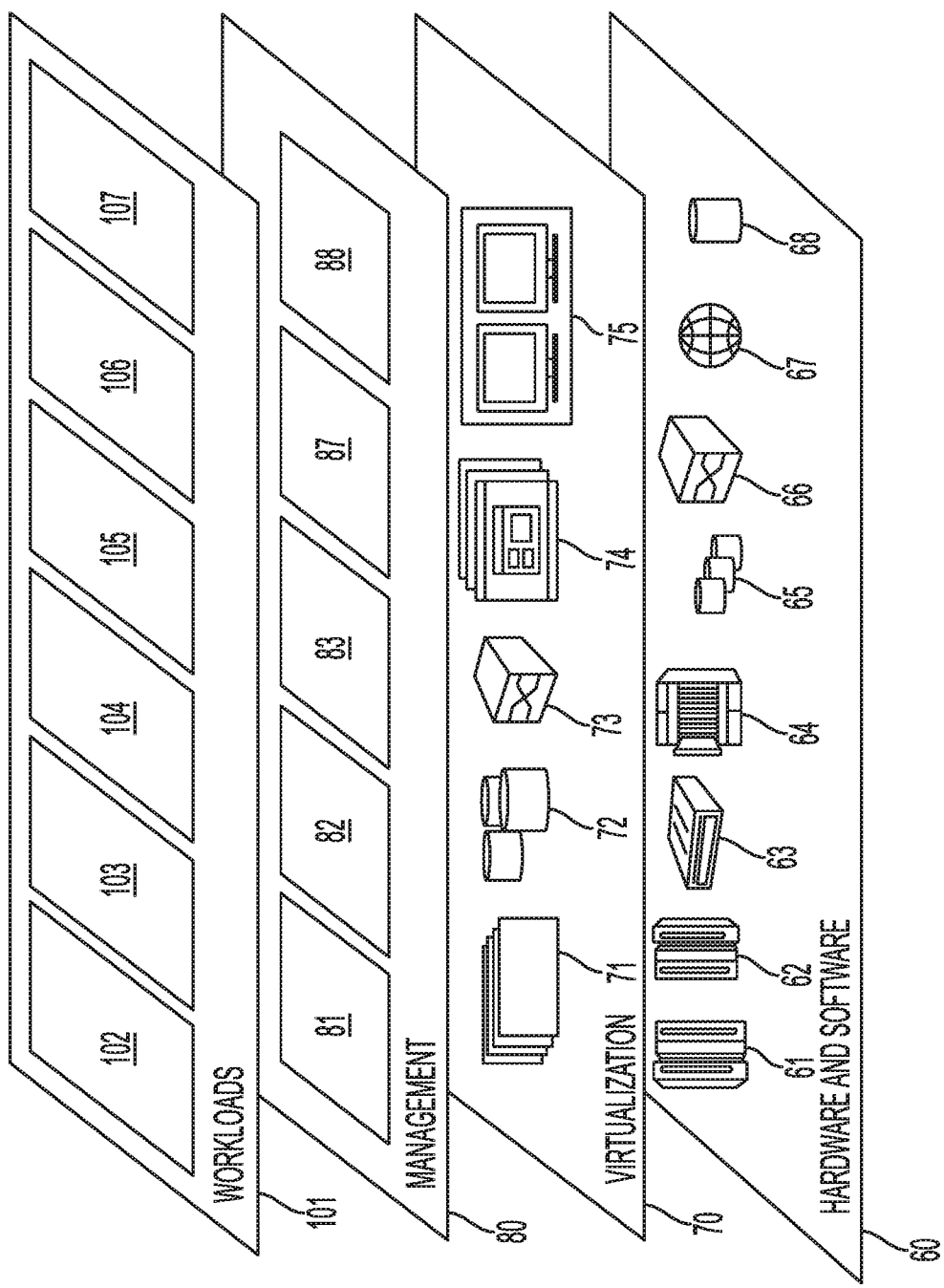
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network and Internet technology associated with detecting and identifying local devices, establishing communications between a user device and the local devices, detecting geographical locations of the user device, and generating and presenting network search results associated with the user device and the local devices 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated identification method comprising:
   receiving, by a processor of an identification hardware device from a plurality of users, permission to identify and monitor items associated with said plurality of users;
   detecting, by said processor via a plurality of sensors in response to said receiving said permission, previously installed local devices located at a first geographical location, wherein said local devices comprise an autonomous robotic device and detected mobile devices, and wherein said detecting comprises sensing, via said plurality of sensors, said mobile devices and said robotic device autonomously performing operational functions with respect to an increased amount of speed and precision;

detecting, by said processor via said plurality of sensors, packet length attributes, cluster devices, and identification data identifying each device of the local devices;

storing, by said processor, said packet length attributes, said cluster devices, and said identification data within a network device;

detecting, by said processor via said plurality of sensors, a user and a user device, of said user, arriving at said first geographical location;

establishing, by said processor, communications between said user device and said local devices;

determining by said processor via said plurality of sensors, a travel path of said user and said user device traveling throughout said first geographical location;

additionally determining, by said processor via said plurality of sensors, that said user device is within a specified proximity with respect to said autonomous robotic device;

biometrically detecting, by said processor via a heart rate monitor, a blood pressure monitor, a temperature sensor, a pulse rate monitor, or an optical sensor of said plurality of sensors, current behavior interactions of said user;

retrieving for said user device and from said local devices, by said processor in response to said additionally determining and said biometrically detecting, said identification data and associated metadata describing said local devices;

detecting, by said processor, user movement causing said user to initiate motion and travel to a second geographical location differing from said first geographical location;

detecting, by said processor via said plurality of sensors, said user and said user device arriving at said second geographical location;

receiving, by said processor via said user device, a network-based request for locating a specified item;

analyzing, by said processor in response to said network-based request, said identification data and associated metadata; and presenting, to said user in response based on results of said analyzing, network search results comprising a list of items and associated descriptions associated with said network-based request thereby causing said user to retrieve an item of said list of items, wherein said list of items and associated descriptions comprise an entry associated with at least one device of said local devices.

2. The method of claim 1, wherein said first geographical location comprises a location associated with a first user of said plurality of users, and wherein said local devices belong to said first user.

3. The method of claim 1, wherein said identification data and associated metadata comprises data and metadata selected from the group consisting of a unique identifier (UID), a device description, a device type, a device manufacturer, and device operating characteristics.

4. The method of claim 1, wherein said network device comprises a device selected from the group consisting of an IOT device and a router.

5. The method of claim 1, wherein said communications between said user device and said local devices are enabled via a communication protocol selected from the group consisting of a WIFI protocol, a short-wavelength UHF radio wave protocol, and an RFID protocol.

6. The method of claim 1, further comprising:
filtering, by said processor, said entry associated with said at least one device to a top portion of said list of items.

7. The method of claim 1, wherein said entry comprises a same device as said at least one device.

8. The method of claim 1, wherein said entry comprises a recommended variant device with respect to said at least one device.

9. The method of claim 1, wherein said list of items is presented to said user at a specified time period associated with a special occasion of said user.

10. The method of claim 1, further comprising:
filtering, prioritizing, and recommending said entry based on an associated system outcome associated with differing online platforms.

11. The method of claim 1, further comprising:
providing at least one support service for at least one of creating, integrating, hosting, maintaining, and deploying computer-readable code in the control hardware, said code being executed by the computer processor to implement: said receiving said permission, said detecting said local devices, said storing, said detecting said user and said user device arriving at said first location, said establishing, said retrieving, said detecting said user and said user device arriving at said second location, said receiving said network based request, said analyzing, and said presenting.

12. A computer program product, comprising a non-transitory computer readable hardware storage device storing a computer readable program code, said computer readable program code comprising an algorithm that when executed by a processor of an identification hardware device implements an automated identification method, said method comprising:

receiving, by said processor from a plurality of users, permission to identify and monitor items associated with said plurality of users;

detecting, by said processor via a plurality of sensors in response to said receiving said permission, previously installed local devices located at a first geographical location, wherein said local devices comprise an autonomous robotic device and detected mobile devices, and wherein said detecting comprises sensing, via said plurality of sensors, said mobile devices and said robotic device autonomously performing operational functions with respect to an increased amount of speed and precision;

detecting, by said processor via said plurality of sensors, packet length attributes, cluster devices, and identification data identifying each device of the local devices;

storing, by said processor, said packet length attributes, said cluster devices, and said identification data within a network device;

detecting, by said processor via said plurality of sensors, a user and a user device, of said user, arriving at said first geographical location;

establishing, by said processor, communications between said user device and said local devices;

determining by said processor via said plurality of sensors, a travel path of said user and said user device traveling throughout said first geographical location;

additionally determining, by said processor via said plurality of sensors, that said user device is within a specified proximity with respect to said autonomous robotic device;

biometrically detecting, by said processor via a heart rate monitor, a blood pressure monitor, a temperature sensor, a pulse rate monitor, or an optical sensor of said plurality of sensors, current behavior interactions of said user;

retrieving for said user device and from said local devices, by said processor in response to said additionally determining and said biometrically detecting, said identification data and associated metadata describing said local devices;

detecting, by said processor, user movement causing said user to initiate motion and travel to a second geographical location differing from said first geographical location;

detecting, by said processor via said plurality of sensors, said user and said user device arriving at said second geographical location;

receiving, by said processor via said user device, a network-based request for locating a specified item;

analyzing, by said processor in response to said network-based request, said identification data and associated metadata; and presenting, to said user in response based on results of said analyzing, network search results comprising a list of items and associated descriptions associated with said network-based request thereby causing said user to retrieve an item of said list of items, wherein said list of items and associated descriptions comprise an entry associated with at least one device of said local devices.

13. The computer program product of claim 12, wherein said first geographical location comprises a location associated with a first user of said plurality of users, and wherein said local devices belong to said first user.

14. The computer program product of claim 12, wherein said identification data and associated metadata comprises data and metadata selected from the group consisting of a unique identifier (UID), a device description, a device type, a device manufacturer, and device operating characteristics.

15. The computer program product of claim 12, wherein said network device comprises a device selected from the group consisting of an IOT device and a router.

16. The computer program product of claim 12, wherein said communications between said user device and said local devices are enabled via a communication protocol selected from the group consisting of a WIFI protocol, a short-wavelength UHF radio wave protocol, and an RFID protocol.

17. The computer program product of claim 12, wherein said method further comprises:
filtering, by said processor, said entry associated with said at least one device to a top portion of said list of items.

18. The computer program product of claim 12, wherein said entry comprises a same device as said at least one device.

19. The computer program product of claim 12, wherein said entry comprises a recommended variant device with respect to said at least one device.

20. An identification hardware device comprising a processor coupled to a computer-readable memory unit, said memory unit comprising instructions that when executed by the processor implements an automated identification method comprising:

receiving, by said processor from a plurality of users, permission to identify and monitor items associated with said plurality of users;

detecting, by said processor via a plurality of sensors in response to said receiving said permission, previously installed local devices located at a first geographical location, wherein said local devices comprise an autonomous robotic device and detected mobile devices, and wherein said detecting comprises sensing, via said plurality of sensors, said mobile devices and said robotic device autonomously performing operational functions with respect to an increased amount of speed and precision;

detecting, by said processor via said plurality of sensors, packet length attributes, cluster devices, and identification data identifying each device of the local devices;

storing, by said processor, said packet length attributes, said cluster devices, and said identification data within a network device;

detecting, by said processor via said plurality of sensors, a user and a user device, of said user, arriving at said first geographical location;

establishing, by said processor, communications between said user device and said local devices;

determining by said processor via said plurality of sensors, a travel path of said user and said user device traveling throughout said first geographical location;

additionally determining, by said processor via said plurality of sensors, that said user device is within a specified proximity with respect to said autonomous robotic device;

biometrically detecting, by said processor via a heart rate monitor, a blood pressure monitor, a temperature sensor, a pulse rate monitor, or an optical sensor of said plurality of sensors, current behavior interactions of said user;

retrieving for said user device and from said local devices, by said processor in response to said additionally determining and said biometrically detecting, said identification data and associated metadata describing said local devices;

detecting, by said processor, user movement causing said user to initiate motion and travel to a second geographical location differing from said first geographical location;

detecting, by said processor via said plurality of sensors, said user and said user device arriving at said second geographical location;

receiving, by said processor via said user device, a network-based request for locating a specified item;

analyzing, by said processor in response to said network-based request, said identification data and associated metadata; and presenting, to said user in response based on results of said analyzing, network search results comprising a list of items and associated descriptions associated with said network-based request thereby causing said user to retrieve an item of said list of items, wherein said list of items and associated descriptions comprise an entry associated with at least one device of said local devices.

\* \* \* \* \*